(12) United States Patent
Takenaka et al.

(10) Patent No.: US 11,554,407 B2
(45) Date of Patent: Jan. 17, 2023

(54) METHOD FOR MANUFACTURING BRAKE DISC AND BRAKE DISC

(71) Applicant: SUNSTAR ENGINEERING INC., Osaka (JP)

(72) Inventors: Tadashi Takenaka, Osaka (JP); Satoshi Kubota, Osaka (JP)

(73) Assignee: SUNSTAR ENGINEERING INC., Osaka (JP)

( * ) Notice: Subject to any disclaimer, the term of this patent is extended or adjusted under 35 U.S.C. 154(b) by 0 days.

(21) Appl. No.: 17/432,764

(22) PCT Filed: Feb. 4, 2020

(86) PCT No.: PCT/JP2020/004084
§ 371 (c)(1),
(2) Date: Aug. 20, 2021

(87) PCT Pub. No.: WO2020/179316
PCT Pub. Date: Sep. 10, 2020

(65) Prior Publication Data
US 2022/0088667 A1 Mar. 24, 2022

(30) Foreign Application Priority Data
Mar. 6, 2019 (JP) .............................. JP2019-040298

(51) Int. Cl.
*F16D 65/12* (2006.01)
*B21D 53/34* (2006.01)
(Continued)

(52) U.S. Cl.
CPC ........... *B21D 53/34* (2013.01); *B21D 19/005* (2013.01); *B21D 28/14* (2013.01); *F16D 65/12* (2013.01);
(Continued)

(58) Field of Classification Search
CPC ...... B21D 43/28; B21D 53/34; B21D 19/005; B21D 28/14; F16D 65/12; F16D 2065/1316; F16D 2250/0023
(Continued)

(56) References Cited

U.S. PATENT DOCUMENTS

| 4,126,492 A * | 11/1978 | Okunishi | ............... B21D 53/34 148/534 |
| 8,250,898 B2 * | 8/2012 | Takenaka | ................ F16D 65/12 72/356 |
| 8,430,215 B2 * | 4/2013 | Mikura | .................. B21D 53/34 188/218 XL |

FOREIGN PATENT DOCUMENTS

| JP | 2006-142363 | 6/2006 |
| JP | 2008-298094 | 12/2008 |

(Continued)

OTHER PUBLICATIONS

International Search Report dated Mar. 10, 2020 in International (PCT) Application No. PCT/JP2020/004084.
(Continued)

*Primary Examiner* — Christopher P Schwartz
(74) *Attorney, Agent, or Firm* — Wenderoth, Lind & Ponack, L.L.P.

(57) ABSTRACT

In a brake-disc intermediate product, a corrugated portion is molded using an upper mold and a lower mold. The brake-disc intermediate product is set in a mold, the mold has a slope corresponding to the corrugated portion, and an angular portion formed along the outer circumferential edge of the corrugated portion is in contact with the slope in a state where the brake-disc intermediate product is set in the mold. The angular portion in contact with the slope is deformed by pressing the brake-disc intermediate product in a direction of the mold, to mold a chamfer portion. The slope is formed so that a chamfering angle formed with respect to an inner bottom surface of the mold is larger at a portion in contact with the concave portion than a chamfering angle at a portion in contact with the convex portion.

12 Claims, 12 Drawing Sheets

(51) Int. Cl.
*B21D 19/00* (2006.01)
*B21D 28/14* (2006.01)
*F16D 65/02* (2006.01)

(52) U.S. Cl.
CPC ................ *F16D 2065/1316* (2013.01); *F16D 2250/0023* (2013.01)

(58) Field of Classification Search
USPC ........... 72/356; 148/534; 188/18 A, 218 XL; 29/407.05, 596
See application file for complete search history.

(56) References Cited

FOREIGN PATENT DOCUMENTS

| | | |
|---|---|---|
| JP | 2010-236675 | 10/2010 |
| JP | 2012-141065 | 7/2012 |
| JP | 2013-53741 | 3/2013 |
| WO | 2005/054703 | 6/2005 |

OTHER PUBLICATIONS

Japanese Office Action dated Jun. 30, 2020 in Janese Patent Application No. 2020-92808 with English translation.
Extended European Search Report dated Jun. 1, 2022 in corresponding European Patent Application No. 20766891.4.

* cited by examiner

METHOD FOR MANUFACTURING BRAKE DISC AND BRAKE DISC

TECHNICAL FIELD

The present invention relates to a method for manufacturing a brake disc, and to a brake disc.

BACKGROUND ART

A brake disc is formed by performing round punching on a plate-like member in a first press step and then performing chamfering. However, when the chamfering is performed by cutting, man-hours increase to cause an increase in cost, and in many cases, the chamfering is performed by pressing as in Patent Literatures 1 to 3 described below. However, in these methods, variation in amount of chamfering occurs, which has an effect on brake performance. This tendency is not a major problem with a mere circular disc, but in a disc of a petal shape with a concavo-convex outer circumferential surface, the variation becomes remarkable to a level where its effect on the brake performance cannot be ignored. Further, in the concave portion of the petals in the first press step, sagging decreases or burrs increase depending on the press conditions, and burrs increase when a clearance between an upper mold and a lower mold is made large so as to ensure an amount of sagging, which has an effect on the positioning accuracy at the time of the surface press. Moreover, an increase in the ridge of the side surface at the time of the surface press has also been a problem.

CITATION LIST

Patent Literature

PTL 1: Japanese Patent No. 4155301
PTL 2: Japanese Patent No. 4973586
PTL 3: Japanese Patent Laid-Open No. 2008-298094

SUMMARY OF INVENTION

Technical Problem

The present invention has been made in view of the above facts, and an object of the present invention is to reduce the difference in amount of chamfering between a concave portion and a convex portion in a brake disc having a corrugated portion in which the concave portion and the convex portion are repeatedly formed over the outer circumference.

Solution to Problem

For solving the above problems, a method for manufacturing a brake disc according to the present invention includes: a press step of molding, by press molding, a brake-disc intermediate product that includes a corrugated portion in which a concave portion and a convex portion are repeatedly formed over an outer circumference; a mold set step of setting the brake-disc intermediate product in a mold, in which the mold has a slope corresponding to the corrugated portion, and an angular portion formed along at least one outer circumferential edge of the corrugated portion is in contact with the slope in a state where the brake-disc intermediate product is set in the mold; and a surface press step of deforming the angular portion in contact with the slope by pressing the brake-disc intermediate product set in the mold in a direction of the mold, to mold a chamfer portion. The slope of the mold is formed so that a chamfering angle formed with respect to an inner bottom surface of the mold is larger at a portion in contact with the concave portion than a chamfering angle at a portion in contact with the convex portion.

The preferable press step is a step of press-molding the brake-disc intermediate product by using at least an upper mold and a lower mold, and a clearance between the upper mold and the lower mold in the concave portion is larger than a clearance between the upper mold and the lower mold in the convex portion.

Preferably, the clearance between the upper mold and the lower mold is set so that sagging formed along the other outer circumferential edge of the corrugated portion by the press step is uniform in amount of sagging in the convex portion and the concave portion.

In the present invention, a shape of the concave portion of the brake disc may be horizontally asymmetric. Further, a tangent of at least one of two lateral sides constituting the concave portion of the brake disc may form an angle of 45° or less with respect to a radial direction.

Preferably, the slope of the mold is set so that the chamfering angle on a lateral side having a smaller angle with respect to the radial direction out of the two lateral sides constituting the concave portion is larger than the chamfering angle on the opposite lateral side. In this case, more preferably, the chamfering angle of the slope is set so that an amount of chamfering is uniform along the outer circumferential edge of the corrugated portion.

Preferably, a gap is maintained between a bottom surface of the brake-disc intermediate product and the inner bottom surface of the mold through the mold set step and the surface press step.

The method may further include a burr removal step of removing a burr of the corrugated portion caused by the press step, and the mold set step is a step of setting in the mold the brake-disc intermediate product in which a burr is removed by the burr removal step.

The method may further include a finish step of finishing the brake-disc intermediate product after the surface press step, in which a burr extending from the chamfer portion to the gap is removed by the finish.

A method for manufacturing a brake disc according to another aspect of the present invention includes: a press step of molding, by press molding, a brake-disc intermediate product that includes a corrugated portion in which a concave portion and a convex portion are repeatedly formed over an outer circumference; a mold set step of setting the brake-disc intermediate product in a mold, in which the mold has a slope corresponding to the corrugated portion, an angular portion formed along an outer circumferential edge of the corrugated portion is in contact with the slope in a state where the brake-disc intermediate product is set in the mold, and a gap is formed between a bottom surface of the brake-disc intermediate product and an inner bottom surface of the mold; and a surface press step of deforming the angular portion in contact with the slope by pressing the brake-disc intermediate product set in the mold in a direction of the mold, to mold a chamfer portion, in which a gap is left between the bottom surface of the brake-disc intermediate product and the inner bottom surface of the mold even on completion of the surface press step.

For example, the mold may include a support bar that supports the brake-disc intermediate product in order to form a gap between the bottom surface of the brake-disc intermediate product and the inner bottom surface of the mold during the mold set step and the surface press step. In this case, an end of the support bar may be in contact with the bottom surface of the brake intermediate product, and may be vertically movable in that state.

There is provided a brake disc according to yet another aspect of the present invention, having an outer circumferential portion with which a brake pad is able to be in contact. The outer circumferential portion of the brake disc has a corrugated portion in which a concave portion and a convex portion are repeatedly formed over the outer circumference, a shape of the concave portion is asymmetric, a chamfer portion is formed on at least one outer circumferential edge of the corrugated portion, and in the chamfer portion, a chamfer length L1 in a direction of a brake pad contact surface from the angular portion of the outer circumferential edge is 0.2 mm or more.

Further, in the brake disc, an angle formed by a tangent of at least one of two lateral sides forming the concave portion with respect to a radial direction is 45° or less, and an amount of chamfering of the chamfer portion on each of right and left lateral sides of the concave portion is made uniform so as to be in a range of an error of 0.3 mm or less at a center of each of the right and left lateral sides.

The chamfer portion of the brake disc of the present invention may be molded so that the chamfer length L1 in the direction of the contact surface of the brake pad from the angular portion of the outer circumferential edge is 0.2 to 0.6 mm, and a chamfer length L2 in a direction of an outer circumferential end surface of the corrugated portion from the angular portion is 0.3 to 0.7 mm.

There is provided a brake disc according to still yet another aspect of the present invention, having an outer circumferential portion with which a brake pad is able to be in contact. The outer circumferential portion of the brake disc has a corrugated portion in which a concave portion and a convex portion are repeatedly formed over the outer circumference, a chamfer portion is formed on one outer circumferential edge of the corrugated portion, and sagging is formed on the other outer circumferential edge, the chamfer portion is formed from a fracture surface without presence of a ridge portion of a material, the sagging is made uniform so that variation in amount of sagging of the sagging is held in a range of 0.2 mm or less over an entire circumference of the corrugated portion, and the chamfer portion is made uniform so that variation in amount of chamfering of the chamfer portion is held in a range of 0.2 mm or less over the entire circumference of the corrugated portion. In this aspect, a shape of the concave portion may be horizontally asymmetric, and an angle formed by a tangent of at least one of two lateral sides forming the concave portion with respect to a radial direction may be 45° or less.

The brake disc of the present invention may further include a mounting portion in which a plurality of mounting holes for mounting the brake disc on a rotating body is formed inside the outer circumferential portion. The mounting portion may be molded integrally with the outer circumferential portion.

The brake disc of the present invention may further include a mounting portion in which a plurality of mounting holes for mounting the brake disc on the rotating body are formed inside the outer circumferential portion. The mounting portion is connected to the outer circumferential portion by using connecting means.

DESCRIPTION OF EMBODIMENTS

Hereinafter, one embodiment of the present invention will be described with reference to the drawings.

First Embodiment

Figure 1:
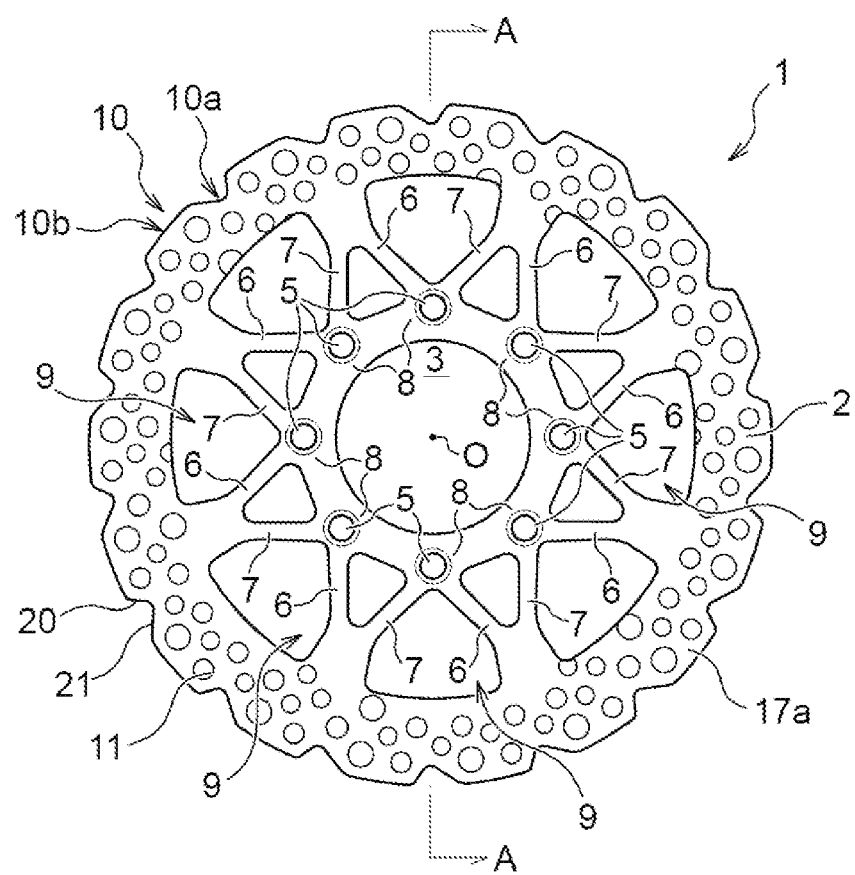
FIG. 1 is a front view of a brake disc (brake disc) according to a first embodiment of the present invention.
Figure 2:
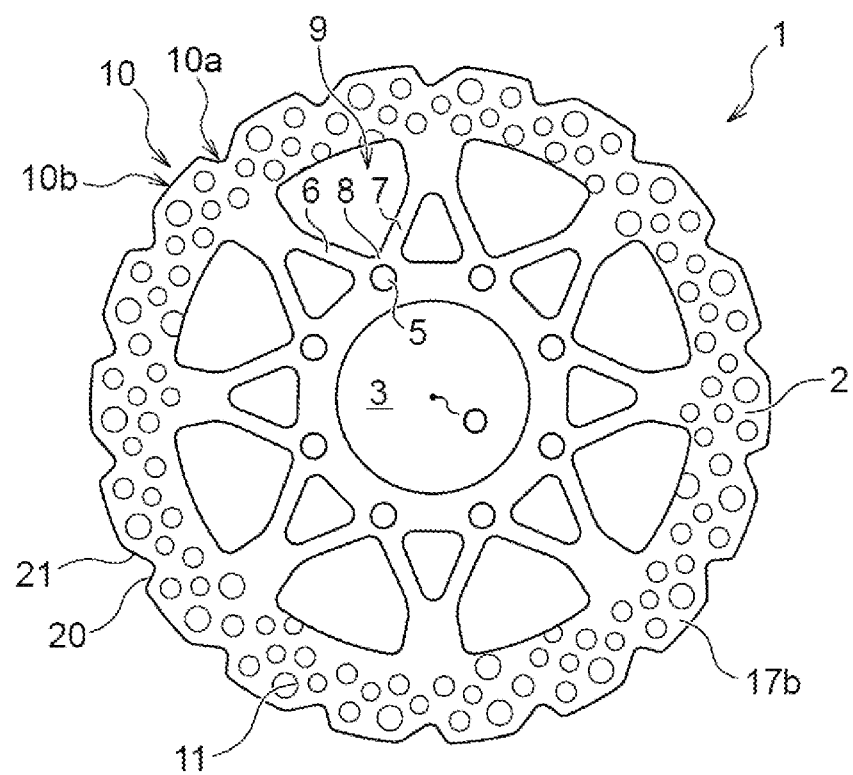
FIG. 2 is a rear view of the brake disc according to the first embodiment.

FIGS. 1 to 5 illustrate a brake disc 1 according to a first embodiment of the present invention. The brake disc 1 is achieved as a brake disc used in a bicycle, a motorcycle, or the like. As a material of the brake disc 1, for example, aluminum, stainless steel, carbon steel, or the like may be used, but is not limited to these examples. FIG. 1 is a view of the brake disc 1 seen from a braking front surface 17*a*, and FIG. 2 is a view of the brake disc 1 seen from a braking rear surface 17*b*.

Figure 3:
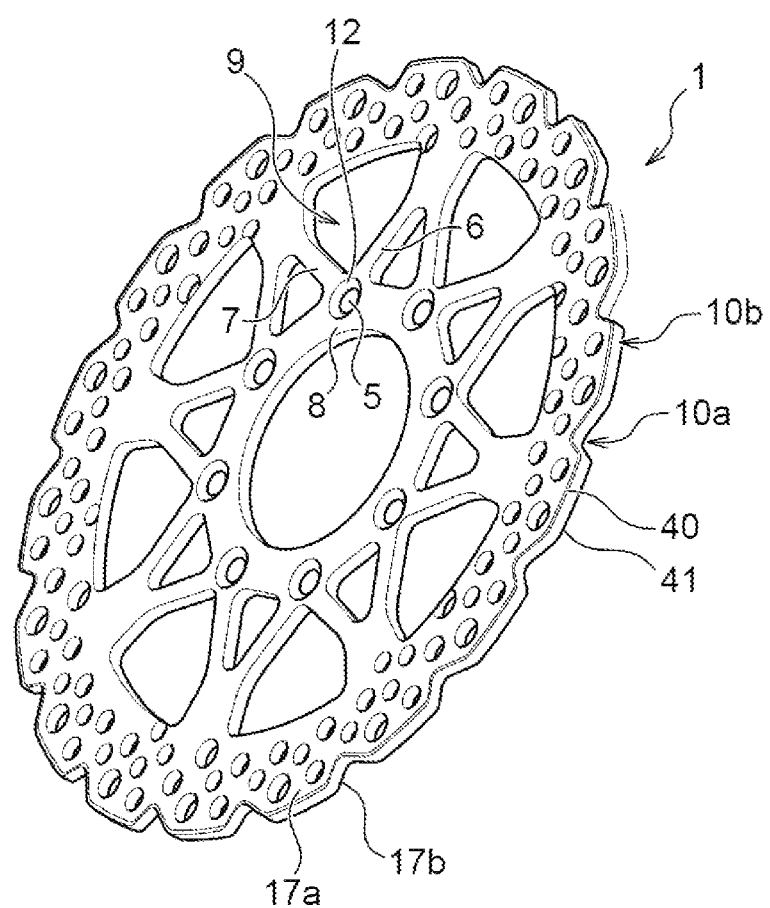
FIG. 3 is a perspective view of the brake disc according to the first embodiment.

As illustrated best in FIGS. 1 to 3, the brake disc 1 includes: an outer circumferential portion 2 with which a brake pad (not illustrated) is brought into contact and to which load is applied at the time of braking; a central opening 3 formed inside the outer circumferential portion 2, and a plurality of mounting holes 5 that are formed in positions projecting from the outer circumferential portion 2 toward the inside of the central opening 3 in order to mount the brake disc 1 on a rotating body (not illustrated) such as a wheel.

On the outer edge of the outer circumferential portion 2, a petal-shaped corrugated portion 10 made by radial repetition of a concave portion 10a and a convex portion 10b is formed, and the outer circumferential portion 2 forms a pad press surface to which a brake pad (not illustrated) can be applied. For example, the brake pad can apply a brake force to the brake disc with a pair of pads by coming into contact with the outer circumferential portion 2 from both sides, the braking front surface 17a and the braking rear surface 17b Therefore, at the time of transmitting the rotation, that is, when the brake pad comes into contact with the outer circumferential portion 2 to apply a brake force, a load is directly applied to the outer circumferential portion 2 in a reverse direction to the rotating direction of the brake disc 1. The pad press surface includes the convex portions 10b of the corrugated portion 10, and by each of the convex portions 10b sequentially coming into contact with the brake pad across the concave portion 10a, a trace of powder generated by the wear of the brake pad can be removed.

The concave portion 10a is formed from two lateral sides 20, 21, and in the present embodiment, the shape of the concave portion 10a is formed asymmetrically. As the asymmetric shape, for example, an angle of a tangent of a lateral side 20 with respect to the radial direction is 45° or smaller, and an angle of a tangent of a lateral side 21 with respect to the radial direction is larger than 45°.

Further, a number of through-holes 11 are also formed in the outer circumferential portion 2, thus making improvement in heat dissipation due to an increase in surface area, improvement in braking properties due to weight saving and reduction in moment of inertia, and improvement in wear debris and mud removal properties.

In the example of FIGS. 1 to 5, eight mounting holes 5 are provided. In the example of the figures, the eight mounting holes 5 are circumferentially distributed so that each center angle (divided angle) formed by two adjacent mounting holes 5, 5 with respect to the center of the brake disc is an equally divided angle that is substantially the same. When the number of mounting hole 5 is eight, the equally divided angle is 360°/8=45°. The arrangement of the mounting holes 5 is determined in accordance with the specifications of the rotating body such as the wheel on which the brake disc 1 is mounted, and hence each divided angle is not necessarily an equally divided angle being the same. It is possible to apply the present invention even when, for example, the divided angles are uneven (may include some even angles) such as 30°, 50°, 55°, 60°, 65°, . . . in accordance with the specifications of the wheel.

In the example of FIGS. 1 to 5, the mounting hole 5 is formed at a radially equal distance from the center O of the brake disc. However, in this regard as well, since the arrangement of the mounting hole 5 is determined in accordance with the specifications of the rotating body such as the wheel, the radial distances of the mounting holes 5 from the center O are not necessarily the same but may be different (may include some equal radii), and also in this case, it is possible to apply the present invention.

Each of the mounting holes 5 is formed in a region 8 where a first crosspiece 6 and a second crosspiece 7 intersect, the first crosspiece 6 extending from the outer circumferential portion 2 toward the inside of the central opening 3 at an inclination angle with respect to the radial direction (a direction extending radially from the disc center O), the second crosspiece 7 extending from the outer circumferential portion 2 toward the inside of the central opening 3 at an inclination angle with respect to the radial direction. The first crosspiece 6, the second crosspiece 7, and the intersecting region 8 each form a circumferential opening 9 along with the outer circumferential portion 2. These intersecting regions 8 may be connected as illustrated.

Figure 4:
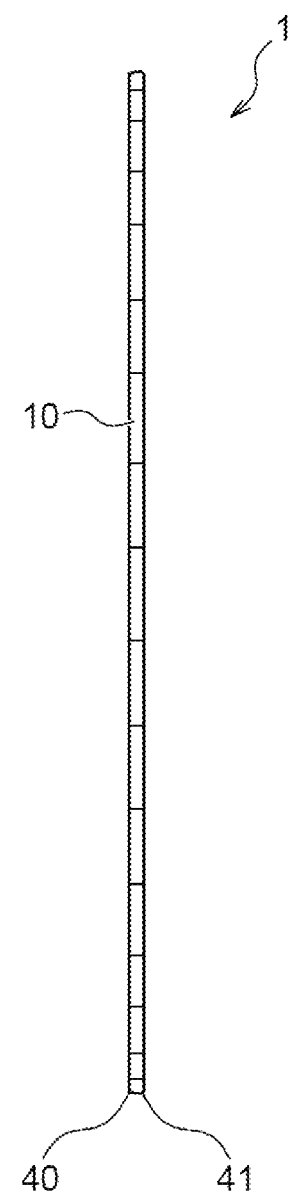
FIG. 4 is a side view of the brake disc according to the first embodiment.

As is apparent from the side view of FIG. 4, the brake disc 1 is formed into a plate shape so that the outer circumferential portion 2, the first crosspiece 6, the second crosspiece 7, the intersecting region 8, and the corrugated portion 10 are held in a predetermined thickness range.

Figure 5:
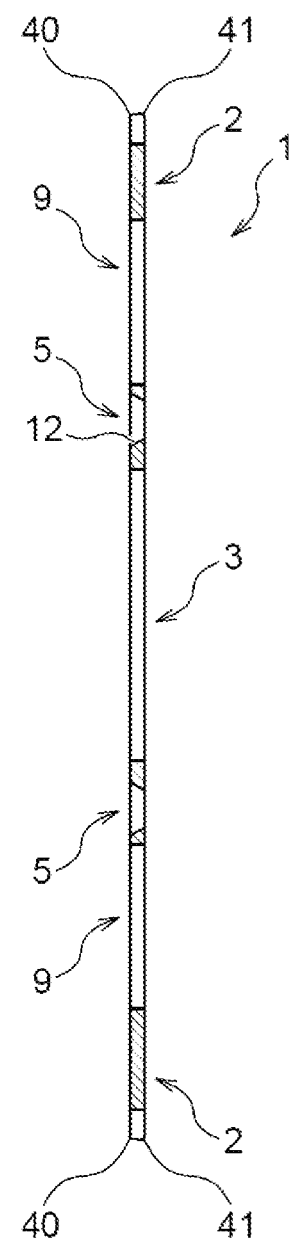
FIG. 5 is a cross-sectional view of the brake disc according to the first embodiment, taken along line A-A of FIG. 1.

The brake disc 1 is mounted on the wheel by pressing the braking rear surface 17b illustrated in FIG. 2 onto the wheel, and screwing bolts through the mounting holes 5 from the braking front surface 17a illustrated in FIG. 1 into screw holes of the wheel. Therefore, as illustrated in FIGS. 1, 2 and 5, the mounting hole 5 may have a portion 12 (FIG. 3) recessed in a dish shape on the front side surface so that the head of the bolt can be seated.

Figure 6:
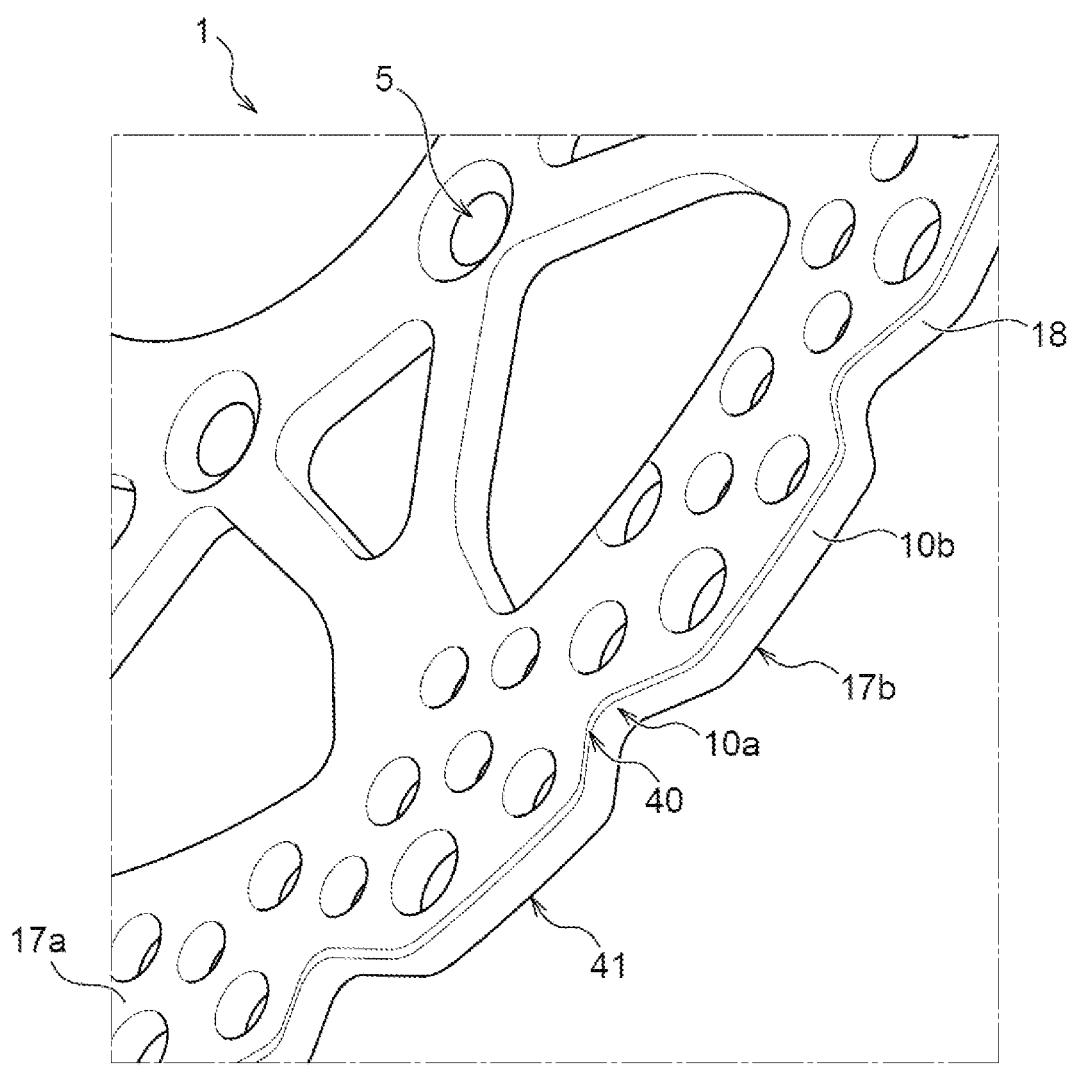
FIG. 6 is a partially enlarged view of the brake disc illustrated in FIG. 3.

FIG. 6 illustrates a partially enlarged view of the corrugated portion made up of the concave portions 10a and the convex portions 10b. As illustrated in the figure, a chamfer portion 40 is formed on the outer circumferential edge being at the boundary between the braking front surface 17a and an outer circumferential end surface 18, and a chamfer portion 41 is formed on the outer circumferential edge being at the boundary between the braking rear surface 17b and the outer circumferential end surface 18.

Figure 10:
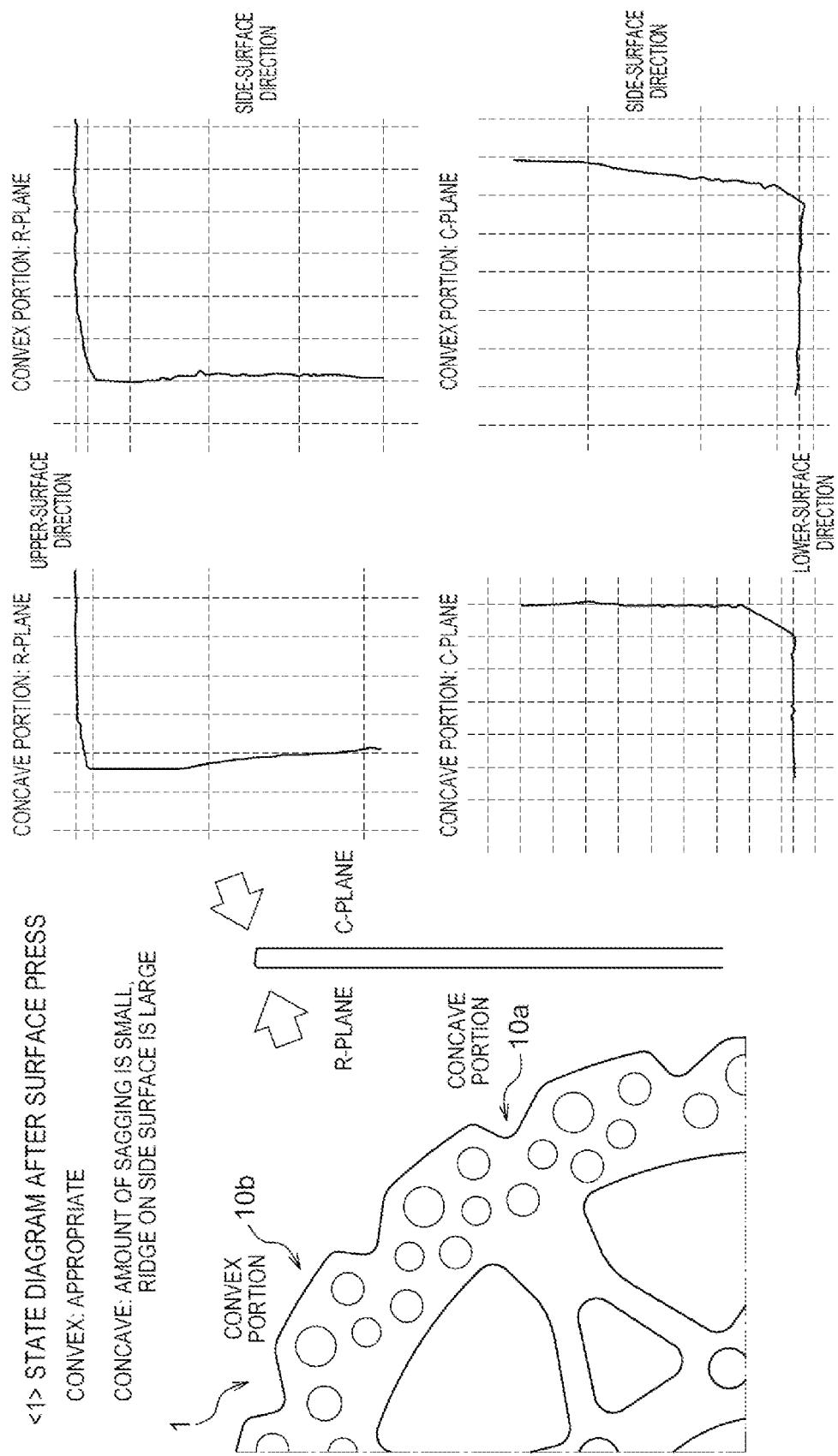
FIG. 10 is a schematic diagram illustrating shapes in lateral-surface directions of a concave portion and a convex portion of a corrugated portion in the brake disc on each of the R-plane and the C-plane when a normal press step and a normal surface press step are performed.

FIG. 10 illustrate a view of a state after the surface press step according to the related art described in Patent Literatures 1 to 3 for molding such a chamfer portion in the brake disc having the corrugated portion as described above.

As illustrated in FIG. 10, the outer circumference of the corrugated portion having the convex portions and the concave portions is first molded by the press step using a punch and a die. By the press step, on the R-plane facing the punch surface, sagging is formed on one of the outer circumferential edges of the corrugated portion, and an angular portion is formed on the other outer circumferential edge of the corrugated portion. When the amount of sagging in the sagging portion is sufficient, the sagging portion can be used as the chamfer portion, so that it is possible to omit the chamfering step on one outer circumferential edge.

In the chamfering step that is performed after the press step, the chamfering is performed on the angular portion formed on the C-plane opposite to the R-plane. FIG. 10 illustrates shapes in lateral-surface directions of the concave portion and the convex portion of the corrugated portion in the brake disc on each of the R-plane and the C-plane when the press step and the surface press step in the related art are performed.

As illustrated in FIG. 10, it is understood that the amount of sagging in the concave portion on the R-plane is smaller than the amount of sagging in the convex portion, and the amount of chamfering in the concave portion on the C-plane is smaller than the amount of chamfering in the convex portion. That is, a problem exists in the related art where the amounts of chamfering in the concave portion and the convex portion are not uniform.

The brake disc 1 according to the first embodiment of the present invention illustrated in FIGS. 1 to 6 has been manufactured by a method to solve such a problem, and the method for manufacturing the brake disc 1 will be described using a flowchart in FIG. 7.

Figure 7:
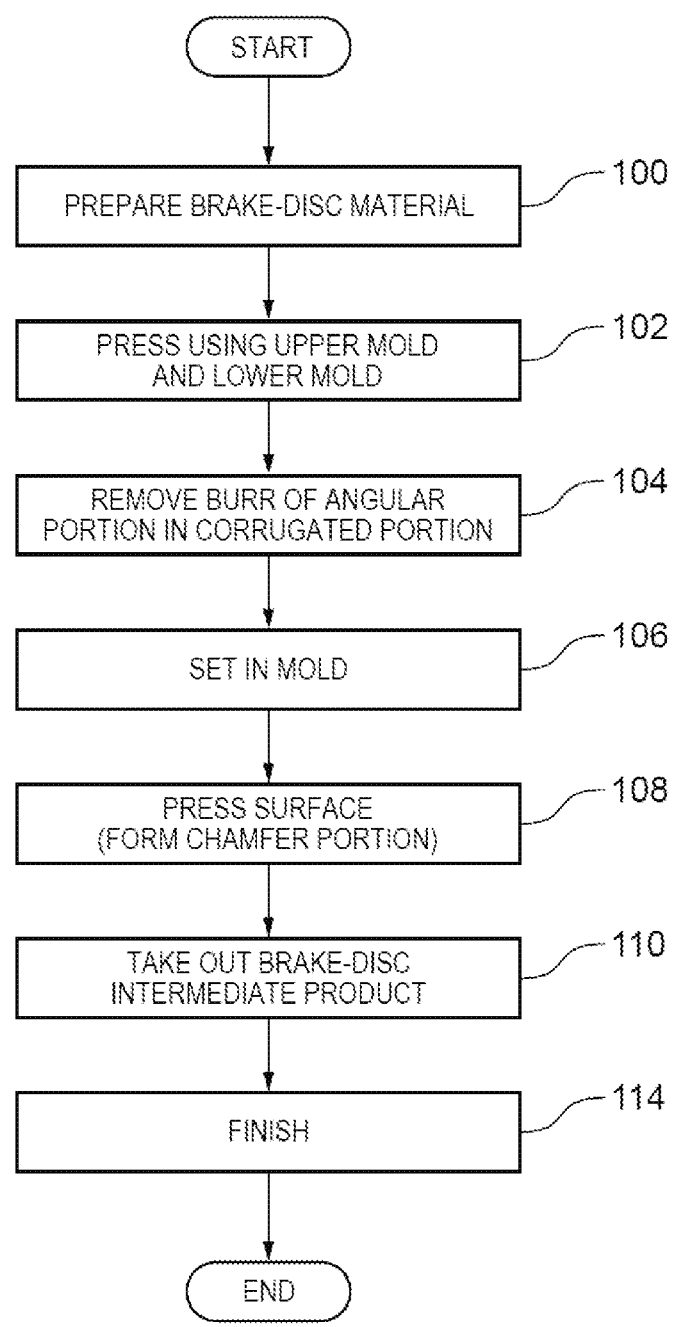
FIG. 7 is a flowchart illustrating the flow of a method for manufacturing the brake disc according to the first embodiment of the present invention.

As illustrated in FIG. 7, first, a brake-disc material is prepared (step 100). As the brake-disc material, it is possible to use a raw roll material (steel sheet) or a circular plate-like material not molded with an outer circumferential portion or an inner circumferential portion. The brake-disc material may be a material ("brake-disc intermediate product") already molded with a part of the brake disc (e.g., the inner circumferential portion made up of the opening 3, the first crosspiece 6, the second crosspiece 7, the intersecting region 8 having the mounting hole 5, and the circumferential opening 9).

Figure 8:
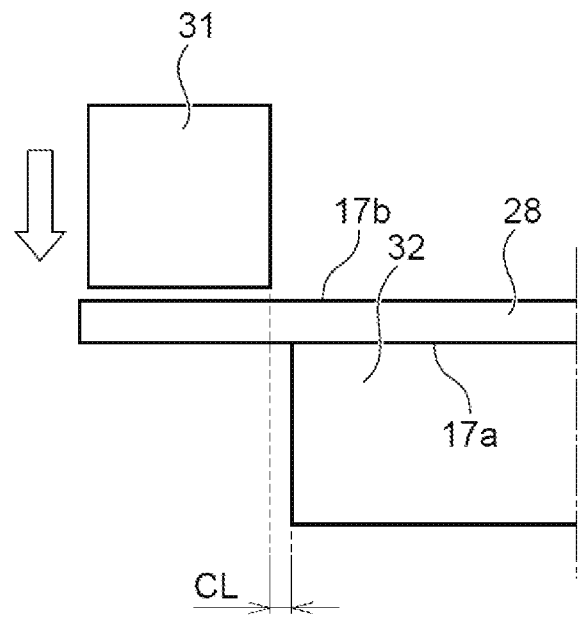
FIG. 8 is a schematic diagram for explaining a press step in the method for manufacturing the brake disc illustrated in FIG. 7.

Next, the press step is performed on the prepared brake-disc material (step 102). In this press step, as illustrated in FIG. 8, a brake-disc material 28 is placed in a lower mold (die) 32, and an upper mold (punch) 31 separated from the lower mold 32 with a predetermined clearance CL is moved downward to press the brake-disc material 28, thereby molding the brake-disc intermediate product in which the outer circumferential portion 2 has become the corrugated portion 10 molded by repeated molding of the concave portion 10a and the convex portion 10b. In the press step of step 102, when the raw roll material or the circular plate-like member is used as the brake-disc material 28, the outer circumferential portion may not be molded alone as described above, but may be molded simultaneously with the inner circumferential portion. Note that the brake-disc material 28 is placed on the lower mold 32 so that the braking front surface 17a faces downward and the braking rear surface 17b faces upward. This is for molding a chamfer portion, which is not sagging, on the braking front surface 17a. Naturally, the opposite to the above may also apply.

Figure 9:
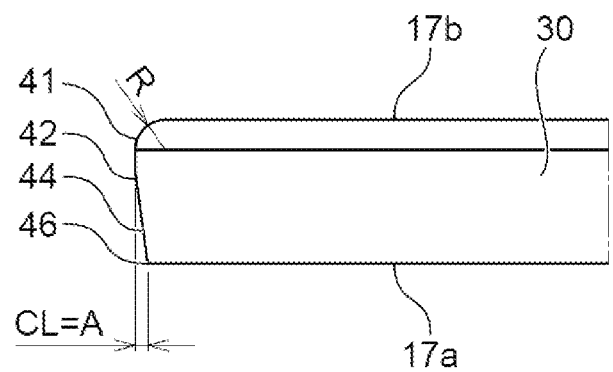
FIG. 9 is a schematic partial cross-sectional view of a brake-disc intermediate product molded by the press step illustrated in FIG. 8.

FIG. 9 illustrates a partially enlarged cross-sectional view of a brake-disc intermediate product 30 molded in step 102. By the press step, a sagging portion 41, a shear portion 42, a fracture portion 44, and an angular portion 46 are formed in the brake-disc intermediate product 30. A burr occurs in the angular portion 46 by the press step, but FIG. 9 illustrates a state where the burr has been removed. Here, the clearance CL=A is formed between the sagging portion 41 and the angular portion 46, and this clearance corresponds to the clearance CL between the upper mold 31 and the lower mold 32 illustrated in FIG. 8. The larger the clearance CL between the upper mold 31 and the lower mold 32, the larger the clearance between the sagging portion 41 and the angular portion 46 also becomes, and the larger the amount of sagging of sagging portion 41 also becomes.

Figure 11:
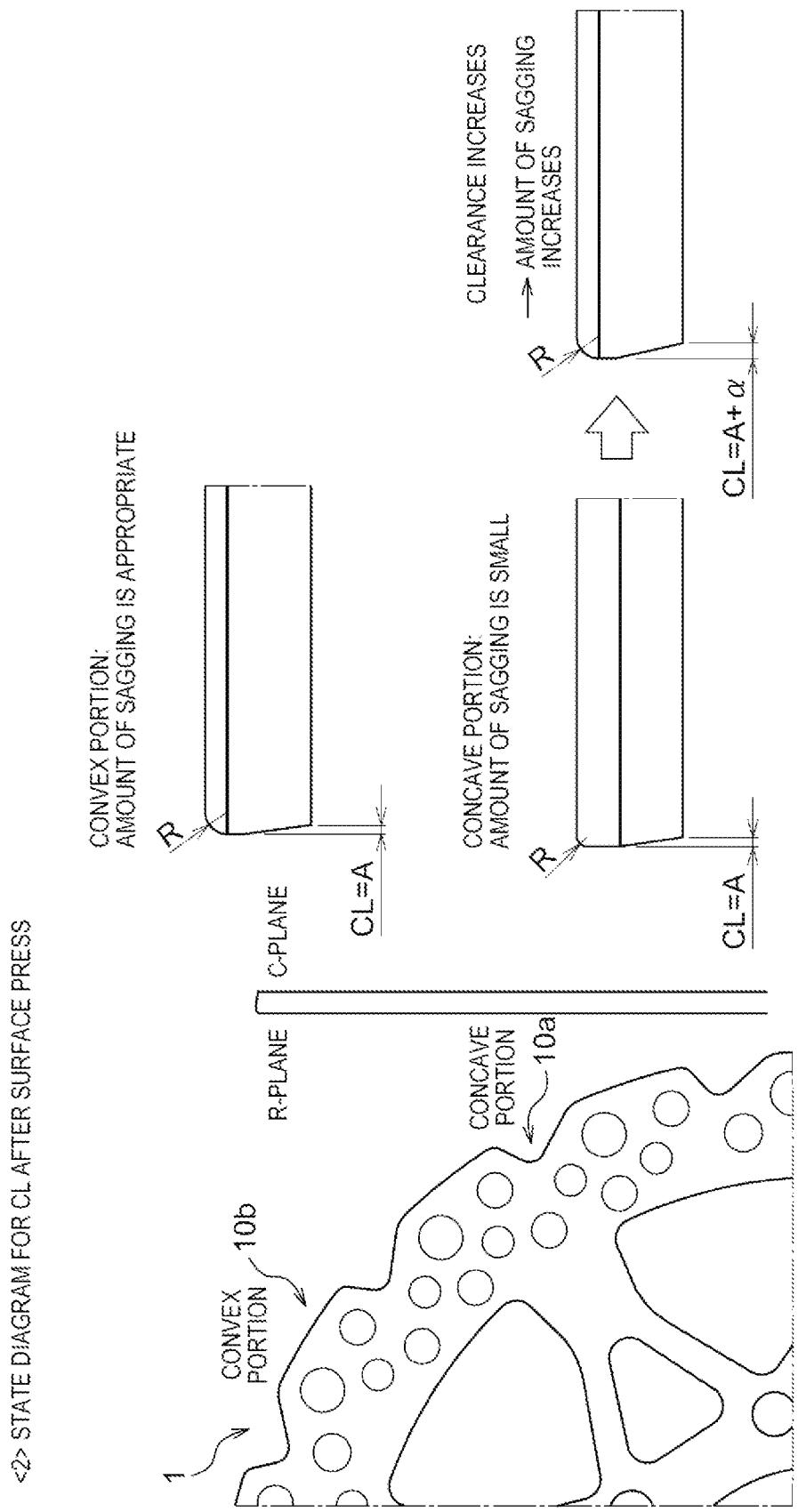
FIG. 11 is a schematic diagram illustrating shapes in lateral-surface directions of the concave portion and the convex portion of the corrugated portion in the brake disc when the normal press step and the normal surface press step are performed, and is a schematic diagram illustrating a relationship between a clearance and an amount of sagging.

As described above concerning FIG. 10, the amount of sagging in the concave portion 10a is smaller than the amount of sagging in the convex portion 10b. FIG. 11 also illustrates this situation. As illustrated in FIG. 11, even when the clearance between the sagging portion 41 and the angular portion 46 is the same, the amount of sagging in the concave portion 10a is small while the amount of sagging in the convex portion 10b is appropriate, and at this rate, the amounts of sagging in the concave portion 10a and the convex portion 10b become non-uniform, leading to an increase in the wear of the brake pad. On the other hand, when the clearance CL is increased in accordance with the concave portion 10a, the amount of sagging in the convex portion 10b, which has been appropriate, becomes excessively large, thereby causing the problem of a burr or the like, or a problem such as the effect on the positioning accuracy at the time of the surface press.

Therefore, in the present invention, by increasing the clearance CL (=A) in the concave portion 10a more than in the convex portion 10b (A→A+α), that is, by using the upper mold 31 and the lower mold 32 where the clearance CL between the upper mold 31 and the lower mold 32 in the concave portion 10a is formed to be larger than the clearance in the convex portion 10b, it is possible to make uniform the amounts of sagging formed by the press step in the convex portion and the concave portion.

Thus, in step 102, the sagging is formed in an amount of sagging appropriate and uniform along one outer circumferential edge of the corrugated portion 10.

Returning to FIG. 7, next, the burr of the corrugated portion 10, particularly the burr of the angular portion 46, formed by the pressing step of step 102 is removed (step 104). Note that step 104 is an option, and the processing may immediately move to the next step 106 without performing the burr removal of step 104. Alternatively, when the burr generated in step 102 is uniform and small in amount, the processing may skip step 104, and otherwise, step 104 may be performed.

Figure 12:
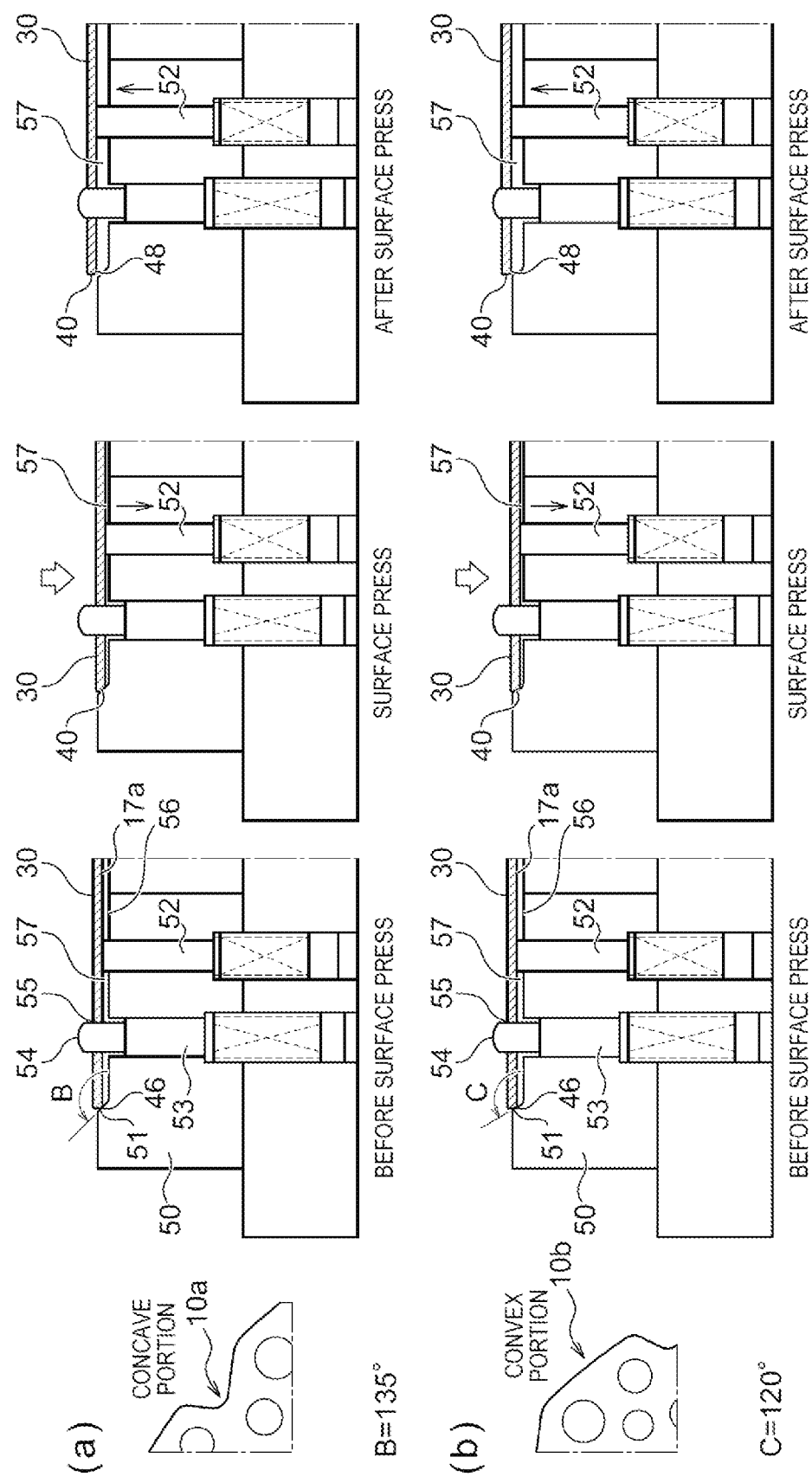
FIG. 12 is a schematic diagram for explaining a surface press step in the method for manufacturing the brake disc illustrated in FIG. 7, where FIG. 12(*a*) illustrates the flow of the surface press step for the concave portion of the corrugated portion in the brake disc, and FIG. 12(*b*) illustrates the flow of the surface press step for the convex portion of the corrugated portion in the brake disc.

Next, the brake-disc intermediate product 30 with the burr removed therefrom is set in the mold (step 106). The set state of step 106 is illustrated in "BEFORE SURFACE PRESS" in FIGS. 12(a) and 12(b). As illustrated in FIGS. 12(a) and 12(b), a mold 50 has a slope 51 corresponding to the corrugated portion 10 of the brake-disc intermediate product 30 to be set on the mold 50, and in a state where the brake-disc intermediate product 30 is set in the mold 50, the angular portion 46 formed along the outer circumferential edge of the corrugated portion 10 is in contact with the slope 51. With the burr having been removed from the angle 46 in step 104, the brake-disc intermediate product 30 is set in the mold 50 without positional deviation. Note that FIG. 12(a) is a cross-sectional view where the angular portion 46 of the concave portion 10a is in contact with the slope 51, and FIG. 12(b) is a cross-sectional view where the angular portion 46 of the convex portion 10b is in contact with the slope 51.

The mold 50 includes: an inner bottom surface 56 continuously formed with the slope 56; a support bar 52 projecting from the inner bottom surface 56, being operable up and down, and supporting the brake-disc intermediate product 30 from the bottom surface; and a positioning bar 53 projecting from the inner bottom surface 56, being operable up and down, and having a round tip 54. In the state before the surface press, the support bar 52 supports the brake-disc intermediate product 30 and forms a gap 57 between the inner bottom surface 56 and the bottom surface of the brake-disc intermediate product 30. Note that the brake-disc intermediate product 30 is set in the mold 50 so that the surface where the chamfer portion is to be molded faces downward (the braking front surface 17a in the example of the figure).

Further, the positioning bar 53 penetrates the positioning hole 55 formed in the brake-disc intermediate product 30, and the tip 54 projects above the brake-disc intermediate product 30, thereby fixing the intermediate product so as not to move. Note that the positioning hole 55 may be substituted by the mounting hole 5 (FIG. 1) formed in the brake-disc intermediate product 30, or when the inner circumferential portion is not yet molded, the positioning hole 55 may be a through-hole formed in a portion present before the opening 3 and the like are molded (removed when the inner circumferential portion is molded).

In comparison between FIG. 12(a) and FIG. 12(b), in the concave portion 10a (the center of the concave portion), an angle B from the inner bottom surface 56 of the slope 51 is 135°, and in the convex portion 10b (the center of the convex portion), an angle C from the inner bottom surface 56 of the slope 51 is 120° That is, the angle of the slope in the concave portion 10a is larger than the angle of the slope in the convex portion 10b. The angle of the slope 51 is preferably changed continuously.

Next, as illustrated in "FACE PRESS" in FIGS. 12(a) and 12(b), the surface press step of pressing the brake-disc intermediate product 30 set in the mold 50 from above is performed using the punch (not illustrated) (step 108 of FIG. 7). At this time, the support bar 52 slightly moves downward by the surface press, but the gap 57 is maintained though narrowing. By this surface press, the angular portion 46 in contact with the slope 51 is deformed to mold the chamfer portion 40.

As described above concerning FIG. 10, after the surface pressing using the mold of the related art, the amount of chamfering of the chamfer portion formed on the C-plane is smaller in the concave portion than in the convex portion. Moreover, in the press step of step 102, the clearance of the concave portion is made large compared to that in the convex portion, as illustrated in FIG. 11. In the present embodiment, in order to deal with that the amount of chamfering becomes smaller in the concave portion and that the clearance becomes larger in the concave portion, the angle of the slope 51 is made larger in the concave portion than in the convex portion to reduce the difference in the amount of chamfering for each location. Thus, in step 108 of FIG. 7, it is possible to mold the chamfer portion 40 with the amount of chamfering uniform over the outer circumference of the brake-disc intermediate product 30.

Next, as illustrated in "AFTER SURFACE PRESS" in FIGS. 12(a) and 12(b), the support bar 52 is moved upward to lift the brake-disc intermediate product 30 from the set position, and in that state, the brake-disc intermediate product is taken out of the mold 50 (step 110 of FIG. 7). Although a burr 48 has occurred in the chamfer portion 40 by the surface press step, with the gap 57 being maintained during the surface press step, the burr 48 is formed so as to project in the direction of the gap 57, that is, downward from the edge of the bottom surface of the brake-disc intermediate product 30, rather than the side surface portion of the brake-disc intermediate product 30. It is thereby possible to prevent the outer circumferential end surface of the corrugated portion 10 from being raised by the surface press.

Then, a finish step is performed (step 114 of FIG. 7). In this finishing step, the removal of the burr 48 having occurred in step 108 is performed simultaneously.

As described above, by the method of the present invention, the brake disc 1 as illustrated in FIGS. 1 to 5 is molded. The chamfer portions 40, 41 (sagging portions) are molded so that the amount of chamfering and the amount of sagging are uniform over the outer circumference of the corrugated portion 10, and no ridge is formed on the outer circumferential end surface of the corrugated portion 10, whereby it is possible to improve the brake performance of a vehicle using the brake disc 1.

Figure 13:
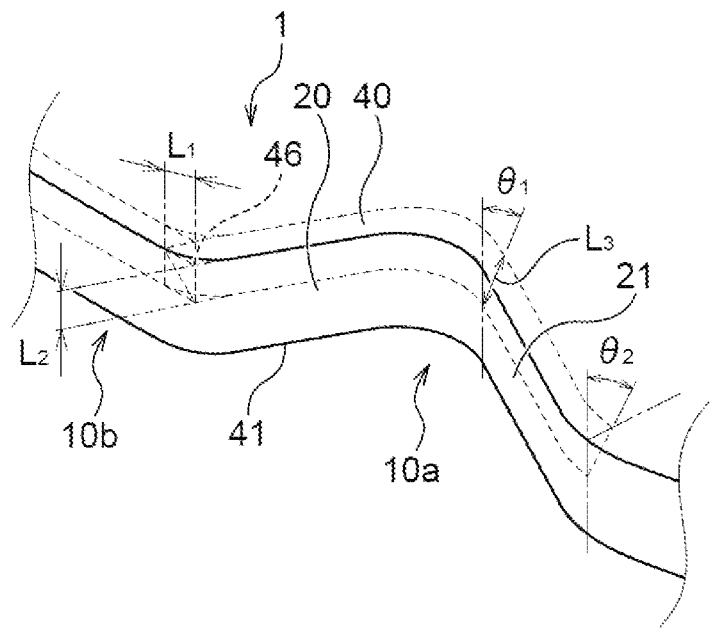
FIG. 13 is an enlarged view of the concave portion and the convex portions of the background portion in the brake disc according to the first embodiment, manufactured by the method for manufacturing the brake disc illustrated in FIG. 7.

FIG. 13 illustrates a partially enlarged view of the corrugated portion of the brake disc as an example, manufactured by the above method of the present invention.

In this brake disc, the angle formed by the tangent of the lateral side 20 forming the concave portion 10a with respect to the radial direction is 45° or less, the chamfer portion 40 is formed on the outer circumferential edge of the corrugated portion 10, and the amount of chamfering of the chamfer portion 40 at each of the right and left lateral sides of the concave portion 10a is made uniform so as to be in a range of an error of 0.3 mm or less at a center of each of the right and left lateral sides. The chamfer portion 40 is molded so that the chamfer length L1 in the direction of the contact surface of the brake pad from the angular portion 46 of the outer circumferential edge is 0.2 mm or more, or more preferably 0.2 mm to 0.6 mm, and the chamfer length L2 in the direction of the outer circumferential end surface of the corrugated portion from the angular portion 46 is 0.3 to 0.7 mm. Further, a chamfering angle θ1 of the chamfer portion 40 at the center of the concave portion 10a is 45° (with respect to the perpendicular line), and a chamfering angle θ2 of the chamfer portion 40 near the boundary between the concave portion 10a and the convex portion 10b is 30° (with respect to the vertical line). The values of these θ1 and θ2 reflect the angles (B=135°, C=120°) of the slope 51 of the mold 40 in FIG. 12.

When the shape of the concave portion 10a is horizontally asymmetric as described above, the chamfering angle on the lateral side 20 having a smaller angle with respect to the radial direction out of the lateral sides of the concave portion 10a may be made shallower, that is larger, than the chamfering angle on the opposite lateral side 21. This prevents the brake-disc intermediate product 30 from deviating in the rotating direction in the surface press step, thus enabling horizontally uniform chamfering.

In the related art, an object to be manufactured has been a brake disc in which the shape of the concave portion is symmetric (and thus the shape of the convex portion is also symmetric), and the angle formed by the tangent of the lateral side of the concave portion with respect to the radial direction is larger than 45°. Even in such a case, when the conventional manufacturing method is applied, the uniform chamfering has been difficult. Further, when the related art is applied at the time of manufacturing a brake disc in which the concave portion is asymmetric and the angle of at least one lateral side is 45° or less, rotational deviation occurs in the brake-disc intermediate product 30 in the surface press step to make the uniform chamfering more difficult, which has been problematic. According to the embodiment of the present invention, even in such a case, the angle of the slope of the mold 40 is changed in accordance with the position of the concave portion 10a, and hence the uniform chamfering is possible.

Note that the method for manufacturing the brake disc according to the present invention is also applicable to the manufacturing of the brake disc in which the concave portion 10a is symmetric, and even in such a case, the amount of chamfering can be made more uniform compared to the related art.

Second Embodiment

In the first embodiment, the entire brake disc 1 has been molded integrally. The brake disc according to the present invention is not limited thereto but can also be made up of two or more components. This example will be described using FIG. 14 as a second embodiment. As for configuration requirements of the second embodiment which are the same as those of the first embodiment, "b" is appended to each of the same reference numerals, and detailed description will be omitted.

Figure 14:
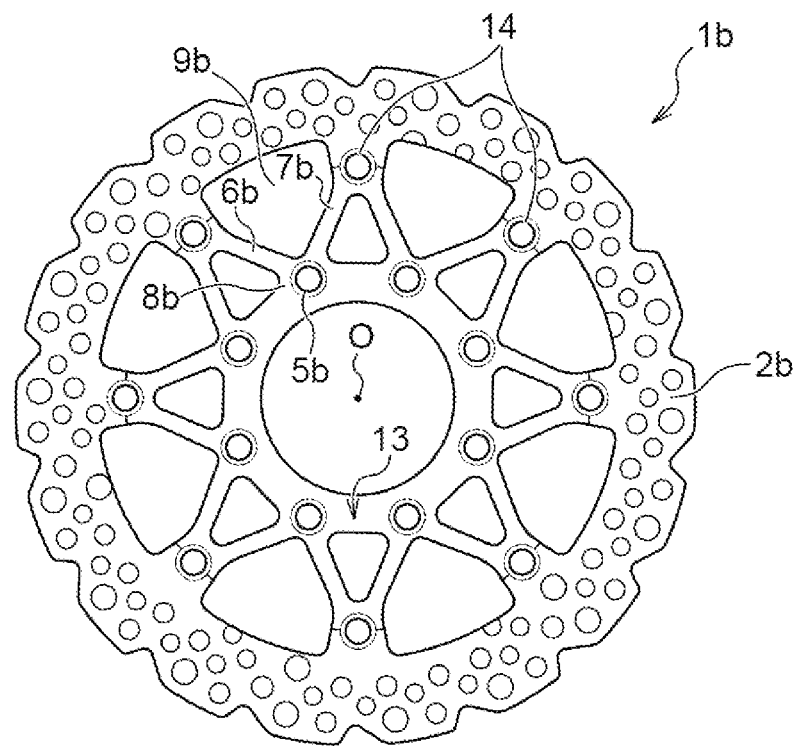
FIG. 14 is a front view of a brake disc according to a second embodiment of the present invention.

As illustrated in FIG. 14, a brake disc 1b according to the second embodiment is provided with an outer circumferential portion 2b and a crosspiece inner circumferential portion 13, and the crosspiece inner circumferential portion 13 is connected to the outer circumferential portion 2b via a plurality of bridge portions 15, extending from the outer circumferential portion 2b to the central opening 3b, and pins 14.

In the crosspiece inner circumferential portion 13, all first crosspieces 6b and second crosspieces 7b of the brake disc 1b are molded integrally, and mounting holes 5b are formed in the respective intersecting regions 8b where the first and second crosspieces intersect. Note that the plurality of mounting holes 5b include a hole at a different distance from the center O.

The outer circumferential portion 2b has the same configuration as that of the outer circumferential portion 2 according to the first embodiment and can be manufactured by the method of FIG. 7. In this case, step 114 of FIG. 7 includes a step of connecting the crosspiece inner circumferential portion 13 manufactured in another step to the outer circumferential portion 2b manufactured in steps 100 to 112.

In the second embodiment, in addition to the same effects as those of the first embodiment, it is possible to provide a brake disc that is made applicable by replacing only the crosspiece inner circumferential portion 13 in accordance with the specifications of the wheel. Alternatively, contrary to the above, only the outer circumferential portion 2b can be replaced due to wear or the like.

Although the above are the brake disc and the method for manufacturing the brake disc according to the embodiments of the present invention, the present invention is not limited to the above examples but can be changed in a freely selectable and suitable manner within the scope of the present invention.

For example, although the chamfer portion 41 is obtained using the sagging having occurred in the press step as the chamfer portion, the chamfer portion 41 can also be molded by the surface press step illustrated in FIGS. 12(a) and 12(b).

Further, the inner circumferential portion of the brake disc 1 (the configuration radially inside the outer circumferential portion 2) is not limited to the above example but can be changed as appropriate in accordance the use, performance, or the like.

REFERENCE SIGNS LIST

1, 1b brake disc
2, 2b outer circumferential portion
3, 3b central opening
5, 5b mounting hole
6, 6b first crosspiece
7, 7b second crosspiece
8, 8b intersecting region
9, 9b circumferential opening
10 corrugated portion
10a concave portion
10b convex portion
11, 11b hole for weight reduction
12 portion recessed in dish shape
13 crosspiece inner circumferential portion
14 pin
15 bridge portion
17a braking front surface
17b braking rear surface
20 lateral side of concave portion 10a (side at 45° or less with respect to radial direction)
21 lateral side of concave portion 10a (side at 45° or more with respect to radial direction)
28 brake-disc material
30 brake-disc intermediate product
31 upper mold
32 lower mold
40 chamfer portion
41 sagging portion
42 shear portion
44 fracture portion
46 angular portion
48 burr
50 mold
51 slope
52 support bar
53 positioning bar
54 round tip
55 positioning hole
56 inner bottom surface
57 gap

The invention claimed is:

1. A method for manufacturing a brake disc, the method comprising:
   a press step of molding, by press molding, a brake-disc intermediate product that includes a corrugated portion in which a concave portion and a convex portion are repeatedly formed over an outer circumference;
   a mold set step of setting the brake-disc intermediate product in a mold, in which the mold has a slope corresponding to the corrugated portion, and an angular portion formed along at least one outer circumferential edge of the corrugated portion is in contact with the slope in a state where the brake-disc intermediate product is set in the mold; and
   a surface press step of deforming the angular portion in contact with the slope by pressing the brake-disc intermediate product set in the mold in a direction of the mold, to mold a chamfer portion,
   wherein in the surface press step, a gap between an inner bottom surface of the mold and a bottom surface of the brake-disk intermediate product is adjusted so that the chamfer portion has a chamfer length L1 of 0.2 mm or more in the direction of the contact surface of the brake pad from the angular portion of the outer circumferential edge.

2. The method for manufacturing a brake disc according to 1, wherein
   a shape of the concave portion of the brake disc is horizontally asymmetric.

3. The method for manufacturing a brake according to claim 2, wherein a tangent of at least one of two lateral sides constituting the concave portion of the brake disc forms an angle of 45° or less with respect to a radial direction.

4. The method for manufacturing a brake disc according to claim 2, wherein the slope of the mold is set so that the chamfering angle on a lateral side having a smaller angle with respect to the radial direction out of the two lateral sides constituting the concave portion is larger than the chamfering angle on the opposite lateral side.

5. The method for manufacturing a brake disc according to claim 3, wherein the chamfering angle of the slope is set so that an amount of chamfering is uniform along the outer circumferential edge of the corrugated portion.

6. The method for manufacturing a brake disc according to claim 1, wherein the gap is maintained between the bottom surface of the brake-disc intermediate product and the inner bottom surface of the mold through the mold set step and the surface press step.

7. The method for manufacturing a brake disc according to claim 6, wherein the mold includes a support bar that supports the brake-disc intermediate product in order to form the gap between the bottom surface of the brake-disc intermediate product and the inner bottom surface of the mold during the mold set step and the surface press step.

8. The method for manufacturing a brake disc according to claim 7, wherein an end of the support bar is in contact with the bottom surface of the brake-disc intermediate product, and is vertically movable in that state.

9. The method for manufacturing a brake disc according to claim 6, further comprising
   a finish step of finishing the brake-disc intermediate product after the surface press step, in which a burr extending from the chamfer portion to the gap is removed by the finish.

10. The method for manufacturing a brake disc according to claim 1, wherein
    the press step is a step of press-molding the brake-disc intermediate product by using at least an upper mold and a lower mold, and
    a clearance between the upper mold and the lower mold in the concave portion is larger than a clearance between the upper mold and the lower mold in the convex portion.

11. The method for manufacturing a brake disc according to claim 10, wherein the clearance between the upper mold and the lower mold is set so that sagging formed along the other outer circumferential edge of the corrugated portion by the press step is uniform in amount of sagging in the convex portion and the concave portion.

12. The method for manufacturing a brake disc according to claim 1, further comprising
    a burr removal step of removing a burr of the corrugated portion caused by the press step,
    wherein the mold set step is a step of setting in the mold the brake-disc intermediate product in which a burr is removed by the burr removal step.

* * * * *